J. TAYLOR.
METHOD AND APPARATUS FOR INSTALLING BOLTS OR THE LIKE.
APPLICATION FILED JULY 22, 1920.
1,433,429.
Patented Oct. 24, 1922.
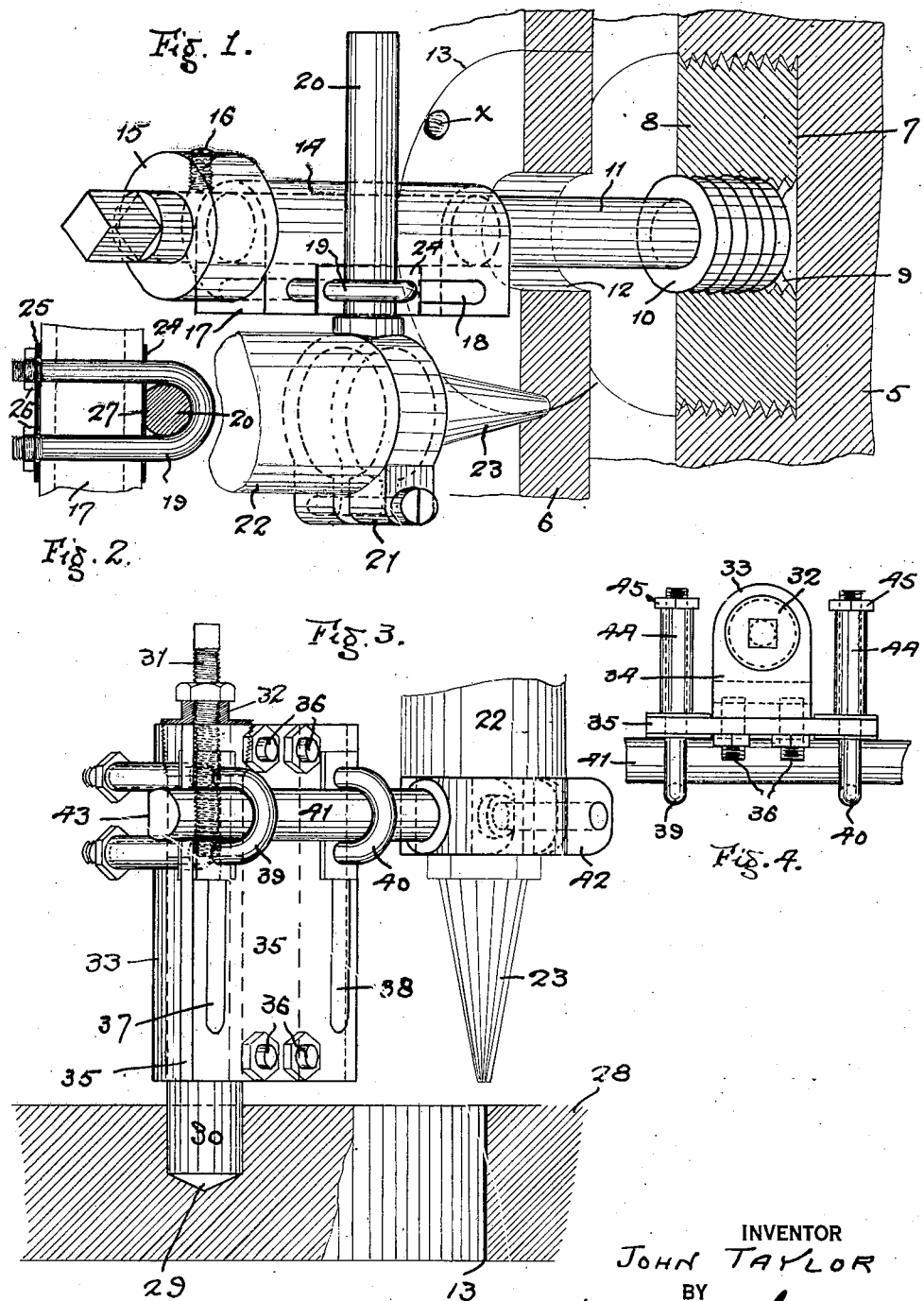

Patented Oct. 24, 1922.

1,433,429

UNITED STATES PATENT OFFICE.

JOHN TAYLOR, OF BROOKLYN, NEW YORK.

METHOD AND APPARATUS FOR INSTALLING BOLTS OR THE LIKE.

Application filed July 22, 1920. Serial No. 398,210.

*To all whom it may concern:*

Be it known that I, JOHN TAYLOR, a citizen of the United States of America, residing at New York city, borough of Brooklyn, in the county of Kings and State of New York, have invented certain new and useful Improvements in Methods and Apparatus for Installing Bolts or the like, of which the following is a specification.

My invention relates to a method and apparatus for installing bolts or the like, and particularly to the method and apparatus for cutting circular holes in metal. The present application is in part a division, and in part a continuation, of my co-pending application Ser. No. 325,889, filed September 24, 1919.

In the accompanying drawings—

Fig. 1 is a perspective of an apparatus in which my invention is embodied in one form, shown in position for operation;

Fig. 2 is a partial section on the line 2—2, Fig. 1;

Fig. 3 is a side elevation of a modified construction; and

Fig. 4 is a plan thereof.

Referring to Fig. 1, I have there illustrated the apparatus in operation for cutting concentric holes in a pair of spaced metal plates 5 and 6, which are to be united by means of the bolt shown in my application above mentioned. The plate 5 has formed therein a tapped well 7, in which is screwed a disc 8 having a central tapped hole 9. The threaded lower end of a pilot pin 11 enters the tapped hole 9 in the disc 8 and extends upward through a hole 12 roughed in the plate 6. In order to cut in the latter a hole 13 co-axial with the tapped well 7 in the plate 5, I mount on the pilot pin 11 a rotatable sleeve 14. The spacing of the sleeve from the plate 6 may be determined in any suitable way, as by means of a collar 15 fastened by a set screw 16 upon the pilot pin, which in cutting a hole in vertical plates, as shown in Fig. 1, lies in horizontal position. The outer end of the sleeve 14 is pressed against this ring by the operative, thus maintaining the apparatus in predetermined position. At one side of the sleeve 14 a rib 17 is formed, which is slotted at 18 to accommodate a U-bolt clamp 19. Engaged by the clamp is the shank 20 of a torch carrier 21. Clamped in the latter is an oxy-acetylene torch, diagrammatically illustrated at 22, with its nozzle 23 adjacent the plate 6. The spacing of the nozzle 23 from the latter is accomplished either by sliding the bolt 19 in the slot 18, or by varying the adjustment of the bearing ring 15 mounted on the pilot pin 11.

The radial adjustment of the nozzle 23 with respect to the axis of the pilot pin 11 is secured by shifting the shank 20 through the loosened clamping bolt 19. Washer plates 24 and 25 may be interposed on the one hand between the shank 20 of the torch carrier and the lug 17 on the sleeve 14, and on the other hand between the draw-up nuts 26 and the rib 17 of the sleeve. In order to maintain the shank 20 in proper position, it may be ground on one side to a flat 27, which bears against the plate 24.

It is obvious that by turning the sleeve 14 around the pilot pin 11 while the torch is in operation, a hole concentric with the well 7 will be cut by the flame in the spaced plate 6. The bolt shown in my co-pending application may then be secured in position as there shown.

In the modifications shown in Figs. 3 and 4, I have shown the apparatus adapted to operate upon a single horizontal plate. In this arrangement the plate 28 has drilled therein a hole 29 adapted to receive the plain stem 30 of the pilot pin. At its outer end the latter is bored to receive an adjusting screw 31 engaging a tapped bushing 32 screwed into the upper portion of the sleeve 33. At one side of the sleeve 33, and bearing against the rib 34, is a carrier plate 35 secured to the rib by stud bolts 36. The carrier plate 35 extends on opposite sides of the rib 34 and is slotted at 37 and 38 to receive the clamping U-bolts 39 and 40 which engage the shank 41 of the torch carrier 42 and press the flat side 43 thereof against the carrier plate 35. Vertical adjustment of the U-bolts in the carrier plate locates approximately the proper position of the torch nozzle 23 from the plate 28, while precise adjustment can be secured by turning the adjusting screw 31. Radial adjustment of the torch nozzle with relation to the axis of the pilot pin 30 is attained by sliding the shank 41 of the torch carrier through the loops of the U-bolts 39 and 40 while the latter are loosened. In the present construction I have shown the U-bolts longer than necessary, and have provided sleeve bushings 44 which are interposed between the nuts 45 and the back of the carrier plate 35. It is obvious that by rotating the sleeve 33 on the pilot pin 30 the torch 22 is swung around the axis of the pin 30 and cuts a hole in the plate 28 concentric with the axis of the pin. In this case the torch cuts away portion of the plate upon which it is supported, and the disc which is cut out should be supported toward the completion of the cut.

While it is generally desired that the wall of the hole cut by the torch shall be parallel to the axis of the pilot pin, and the apparatus is especially designed to effect this result, it is possible to vary the inclination of the torch carrier, or of the torch in the carrier head, so that the direction of the flame lies at an angle to the axis of the pilot pin. In such case the walls of the hole are inclined to its axis. Wherever the thickness of the plate requires, a hole X is drilled as a starting point for the cutting flame.

I do not limit my invention to the details of the constructions shown, which may be variously modified without departing from my invention. The underlying thought of the latter is to provide simple and efficient means for cutting holes in metal by means of an acetylene torch, and particularly for cutting holes in spaced plates where bolts of the type shown in my co-pending application are to be used. I may add that the method is particularly useful in marine work, where an outer plate 5, such as the armor of a war vessel, is spaced from the inner shell 6 of a ship, or where holes are to be cut in a deck or turret. It is obvious, however, that the method and apparatus may be used to advantage for cutting holes in metal plates for any purpose, and I do not restrict my invention therefore to the particular purpose for which I primarily designed it in connection with the subject matter of my co-pending application.

I claim as my invention—

1. A method of forming a hole in one of two spaced plates to register with a previously formed hole in the other plate which comprises mounting in the previously formed hole in one of said plates, a co-axial pilot pin which projects through a hole roughed in the first mentioned plate, mounting on said pin a rotatable torch carrier and rotating the torch carrier on the pilot pin while the torch is in operation, to burn a hole in the first mentioned plate co-axial with that in the plate carrying the pilot pin.

2. A method of cutting a hole in a metal plate which consists in securing a pilot pin at an angle to the plane of the plate, mounting on said pin a rotatable torch carrier, adjusting the distance and angle of the torch with relation to the plane of the plate and swinging the adjusted torch carrier around the pin while the torch is in operation to cut from the plate a disc, the margins of which are parallel or inclined with relation to the axis of the pilot pin, depending upon the adjustment of the torch carrier with relation to the latter.

3. For use in cutting holes in metal plates, a pilot pin adapted to be mounted in fixed position co-axial with the hole to be cut, and a torch carrier, rotatably movable on said pin, to swing around the latter during the operation of the torch, together with means for adjusting the position of the torch carrier with relation to the pilot pin both angularly and laterally, to vary either the diameter of the hole or the inclination of the walls of the hole cut thereby.

In testimony whereof I have signed my name to this specification.

JOHN TAYLOR.